United States Patent [19]
Eikelberger

[11] 3,971,995
[45] July 27, 1976

[54] WHEEL VELOCITY SENSOR WITH EXCITER RING RUNOUT COMPENSATION

[75] Inventor: Rand Jeffrey Eikelberger, Glenview, Ill.

[73] Assignee: Illinois Tool Works Inc., Chicago, Ill.

[22] Filed: Aug. 8, 1975

[21] Appl. No.: 602,938

[52] U.S. Cl. .............................. 328/149; 328/141; 328/147; 328/165; 329/112
[51] Int. Cl.² ......................................... H03H 7/06
[58] Field of Search ............ 329/104, 112; 328/146, 328/149; 328/140, 14 L, 65, 55, 165; 307/282

[56] References Cited
UNITED STATES PATENTS

| | | | |
|---|---|---|---|
| 2,773,181 | 12/1956 | Singel | 329/112 X |
| 2,918,577 | 12/1959 | Casey | 329/112 |
| 3,103,633 | 9/1963 | Hartog | 329/112 X |
| 3,218,468 | 11/1965 | Dupire et al. | 328/146 X |
| 3,417,336 | 12/1968 | Cribbs et al. | 329/112 X |
| 3,533,101 | 10/1970 | Lauchner et al. | 329/112 X |
| 3,553,595 | 1/1971 | Walsh | 328/146 X |
| 3,659,116 | 4/1972 | Sellers et al. | 328/140 X |
| 3,867,706 | 2/1975 | Gili | 328/141 X |

*Primary Examiner*—John S. Heyman
*Attorney, Agent, or Firm*—Glenn W. Bowen; Robert W. Beart

[57] ABSTRACT

A single-core wheel velocity sensor which is substantially immune to exciter ring or wheel runout is provided by a toroidal-shaped magnetic core, a winding on the core, a bias magnet placed adjacent to the core, an oscillator which supplies a high-frequency signal to the core winding and a sensing circuit comprising a differential input amplifier which has a first input terminal coupled to receive the output signal from the winding of the core through a circuit path which has a relatively low value capacitor coupled from the first terminal to ground and a second terminal which has a circuit path which has a relatively high value capacitor coupled from the second terminal to ground, wherein a relatively low value resistor shunts the low value capacitor and a relatively high value resistor shunts the high value capacitor.

2 Claims, 1 Drawing Figure

WHEEL VELOCITY SENSOR WITH EXCITER RING RUNOUT COMPENSATION

BACKGROUND OF THE INVENTION

The use of toroidal cores that are wound with a winding and are supplied with an alternating current electrical signal to sense the velocity of rotation of a magnetizable exciter ring or wheel having teeth or similar projections in the vicinity of the core is known. A common disadvantage of the devices that are shown in the prior art, however, results from the fact that when there is any eccentricity or runout in the exciter ring or wheel, an additional undesired velocity modulation of the carrier signal occurs with the desired velocity modulation. The present invention is directed to a circuit which eliminates this undesirable runout modulation in a wheel velocity sensor of the type described in order to improve the reliability and accuracy of the device.

DESCRIPTION OF THE DRAWINGS

The drawing of the present invention shows a schematic diagram of the wheel velocity sensing circuit of the present invention.

TECHNICAL DESCRIPTION OF THE INVENTION

Figure 1:
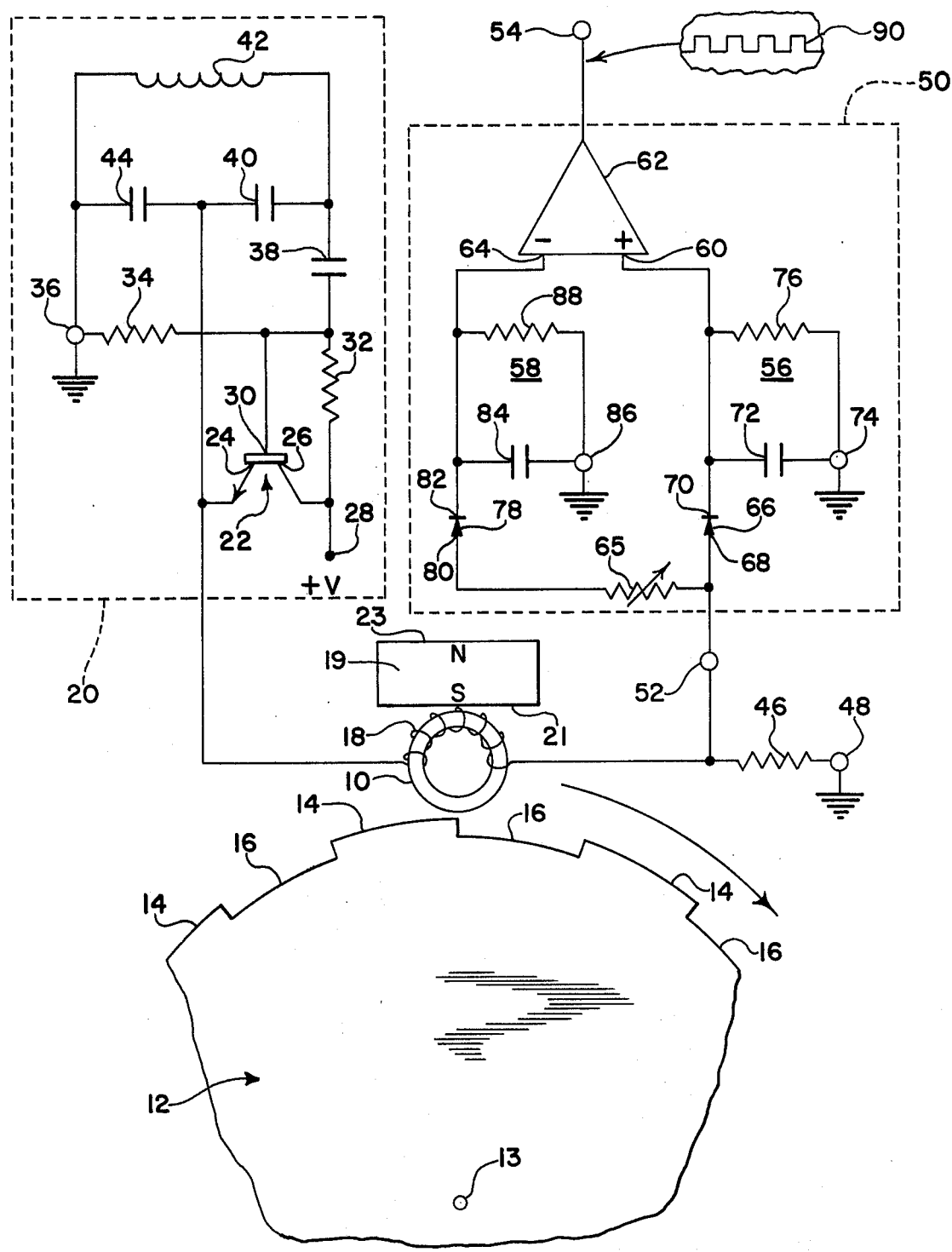

The embodiment of the present invention is illustrated in the schematic diagram in which the core 10 is disposed adjacent the rotating wheel or exciter ring 12. The exciter ring 12 rotates about its center 13 and has a plurality of projecting teeth 14 on its periphery which are separated by the spaces 16 and which successively pass adjacent the core 10 as the ring rotates, as shown by the arrow. The teeth 14 are dimensioned relative to the core 10 such that the core 10 is substantially, magnetically saturated when it is adjacent one of the teeth 14 and so that the core is unsaturated when it is adjacent one of the spaces 16. In this manner, the core 10 becomes successively saturated and unsaturated in correspondence with the velocity of the wheel.

A bias permanent magnet 19 is positioned adjacent the periphery of the core 10 which is disposed away from the rotating exciter ring 12. The magnet 19 is magnetized so that its longitudinal sides 21 and 23 have opposite polarities as shown in the drawing. The purpose of the permanent magnet 19 is to provide a magnetic flux through the core 10 to the exciter ring 12 since the exciter ring 12 is preferably not formed of magnet material. If exciter ring 12 were formed of a magnet material, it would substantially increase the cost of the ring, but then the small permanent magnet 19 could be removed.

A winding 18 is inductively wound on the toroidal core 10 that is coupled to a high frequency alternating current oscillator 20 to supply a carrier signal to the core 10. The oscillator 20 may be any type of suitable high frequency oscillator and in the illustrated embodiment, the oscillator is a Colpitts oscillator, the frequency of which may be on the order of 1 MHz. The oscillator 20 includes a transistor 22 that has its emitter 24 connected to the winding 18 and its collector 26 connected to the terminal 28 that is coupled to a positive voltage source. The base 30 of the transistor 22 is connected to the junction of two resistors 32, 34. The other end of the resistor 34 is connected to the grounded terminal 36 while the other end of the resistor 32 is connected to the collector 26 of the transistor 22. A coupling capacitor 38 is connected between the base 30 and one end of the junction of a capacitor 40 and an inductor 42, the other end of which is connected to the grounded terminal 36. The second end of the capacitor 40 is connected to the junction of another capacitor 44 and the emitter 24 of the transistor 22. The second end of the capacitor 44 is also connected to the grounded terminal 36. The capacitors 40 and 44 and the inductor 42 form the frequency determining elements of the oscillator 20. Current from the oscillator 20 is supplied through winding 18 and a resistor 46 which is connected in series with the winding 18, to ground through the grounded terminal 48.

The portion of the circuit of the drawing which has been thus far described is known from prior art velocity sensing circuits. In order to eliminate exciter ring runout modulation that results from eccentricity of the exciter ring 12, the described velocity sensor utilizes the demodulation and output circuit 50. The circuit 50 has an input terminal 52, which is connected to junction of the resistor 46 and the winding 18, and an output terminal 54. The composite modulated input signal which appears on the input terminal 52 has a modulation component signal which is a function of the rotational velocity of the exciter ring or wheel 12 in accordance with the rate at which the projecting teeth 14 pass the core 10. If the exciter ring 12 were a perfect wheel, it would have no eccentricity with respect its center 13. However, in practice it is practically impossible to produce, at a reasonable cost, an exciter ring which does not have some degree of eccentricity. This eccentricity, or runout, will result in an undesirable modulation of the carrier signal which could cause erroneous velocity indications. The demodulation and output circuit 50 of the present invention provides a means whereby the modulation component that is produced by exciter ring runout, or eccentricity, is substantially eliminated.

Runout modulation is substantially eliminated in the circuit 50 by the use of two envelope detection demodulation networks 56 and 58. The output of the demodulation network 56 is coupled to the noninverting input terminal 60 of a comparator circuit 62 while the output of the demodulation circuit 58 is coupled to the inverting input terminal 64 of the comparator 62. A gain control variable resistor 65 for the network 58 is connected to the junction of the input of the network 56 and the input of the network 58.

The demodulation network 56 consists of a diode 66 which has its anode 68 coupled to the input terminal 52 and its cathode 70 connected to one end of a capacitor 72, the other end of which is connected to the grounded terminal 74. A resistor 76 is connected in shunt across the capacitor 72 with one end of the resistor 76 being connected to the grounded terminal 74 and the other end of the resistor being connected to the noninverting input terminal 60 of the comparator 62.

The demodulating network 58 consists of a diode 78 which has its anode 80 connected to one end of the resistor 65 and its cathode 82 connected to one terminal of the capacitor 84, the other terminal of which is connected to the grounded terminal 86. A resistor 88 is connected in shunt across the capacitor 84, with one end of the resistor being connected to the grounded terminal 86 and the other end of the resistor being connected to the inverting input terminals 64 of the comparator 62.

The values of the capacitor 72 and the resistor 76 of the network 56 are selected so that the output of the demodulation circuit 56 at the noninverting input terminal 60 will be a signal which is responsive to both the desired velocity modulation component and the undesired runout modulation component. The discharge time of capacitor 72 and resistor 76 should be substantially greater than the period (1/$f$) of the carrier and less than the modulation period. For a wheel with tire using a 60-tooth exciter, rotating at one hundred miles per hour the modulation frequency would be approximately 1KHz. Runout modulation typically occurs at one cycle/revolution of the exciter (i.e. for this example 1KHz/60 = 17Hz. The capacitor 72 in this case would have a value of 0.01 microfarad and the resistor 76 would have a value of 100 kilohm.

The capacitor 84 of the network 58 has a substantially greater value than the capacitor 72 and the resistor 88 is correspondingly substantially greater in value than the resistor 76. Thus, the RC time constant for the demodulator network 58 is much greater than the RC time constant for the demodulator network 56. The modulation efficiency of the network 58 for the desired velocity signal modulation is, therefore, much lower and is, therefore, substantially a function of the runout modulation signal only. The gain resistor 65 is employed to reduce the amplitude of the signal from the network 56 to the terminal 64 of the comparitor 62. This is done so that the signal on the terminal 60 will be able to swing both above and below the level of the signal that appears on the terminal 64.

The comparitor 62 is a conventional comparator circuit which is constructed to have a high gain so that each time the signal on the terminal 60 exceeds the signal on the terminal 64 output 54 switches from one signal level to the other to provide a digital output signal. The number of output pulses that are produced on the output terminal 54 during a given time period is equal to the number of teeth 14 that had passed adjacent to the core 10 during this time. In this manner, a pulse train output signal 90 is produced which is directly proportional to the velocity of the exciter ring 12, which is substantially unaffected by exciter ring runout or eccentricity.

In the illustration cited above, for example, the capacitor 84 may be on the order of 0.2 microfarad while the resistor may be on the order of 1 megohm to provide an RC time constant for the demodulation circuit 58 that is approximately two hundred times greater than the RC time constant for the demodulation circuit 56, in order to provide the desired demodulated input signals to the comparator 62.

What is claimed is:

1. A velocity sensing circuit comprising a toroidal magnetic core positioned adjacent a rotating exciter member, the rotational velocity of which is to be sensed, having an alternating series of projections and spaces on its periphery, a winding inductively wound on said core, an alternating signal source coupled to said winding to supply a carrier signal thereto, an output circuit means comprising a comparator having a first noninverting input terminal and a second inverting input terminal, first demodulation means having a first input junction coupled to receive the composite modulated signal appearing on said winding and an output junction coupled to said first input terminal of said comparator having a first RC time constant of a value such that the desired velocity modulation signal and any undesired runout modulation signal may both be demodulated by said first demodulation means and a second demodulation means having a second input junction coupled to receive the composite modulated signal appearing on said winding and an output junction coupled to said second input terminal of said comparator which has a second RC time constant which is substantially larger than said first RC time constant and is of a value such that the desired velocity signal is not substantially demodulated and only the undesired runout modulation signal is substantially demodulated and applied to said second terminal by said second demodulation means.

2. A demodulation system for demodulating a composite modulated signal having as components thereof a desired modulation signal and an undesired modulation signal wherein the undesired modulation signal is of a frequency which is substantially lower than the frequency of the desired modulation signal comprising circuit means for receiving and processing said composite modulated signal comprising a comparator having a first noninverting input terminal and a second inverting input terminal and an output terminal at which an output signal is produced, first demodulation means having a first input junction coupled to receive said composite modulated signal and an output junction coupled to said first input terminal of said comparator and having a first RC time constant of a value such that the desired modulation signal and the undesired modulation signal may both be demodulated by said first demodulation means and a second demodulation means having a second input junction coupled to receive said composite modulated signal and an output junction coupled to said second input terminal of said comparator which has a second RC time constant which is substantially larger than the value of said first RC time constant and is of a value such that the desired modulation signal is not substantially demodulated and only the undesired signal is substantially demodulated and applied to said first terminal by said second demodulation means.

* * * * *